UNITED STATES PATENT OFFICE.

DAVID E. PAYNTER, OF PHILADELPHIA, PENNSYLVANIA, ASSIGNOR TO HIMSELF AND ISRAEL M. BISSEL, OF SAME PLACE.

IMPROVEMENT IN THE MANUFACTURE OF PRECIPITATED SULPHUR.

Specification forming part of Letters Patent No. 23,141, dated March 1, 1859.

*To all whom it may concern:*

Be it known that I, DAVID E. PAYNTER, of the city and county of Philadelphia, and State of Pennsylvania, have invented a useful Improvement in the Manufacture of Precipitated Sulphur; and I do hereby declare the following to be a full, clear, and exact description of the same.

My invention consists in boiling water mixed with the ashes resulting from the combustion of gypsum and coal-dust until a yellow solution is obtained; in adding to the boiling solution a quantity of ordinary brimstone, and finally in precipitating the sulphur by an excess of muriatic acid. The object of my invention is to utilize the aforesaid ashes after the mixture from which they resulted has been used as a fuel.

In order to enable others to practice my invention, I will now proceed to describe the manner in which I carry it into effect.

I first take from six to eight bushels of anthracite-coal dust or coal-screenings, to which I add one bushel of calcined gypsum or plaster-of-paris, and mix the whole with water sufficient to reduce it to the consistency of a semi-liquid paste. When dry this composition may be used as a fuel for manufacturing or household purposes, to which it is as applicable as the coal by itself. The ashes resulting from this combustion of this composition of coal-dust and gypsum consist of sulphuret of calcium combined with a portion of common coal-ashes. This product has been heretofore obtained by John Allen, to whom a patent was granted on the 17th day of March, A.D. 1838, for the mixture of coal-dust and gypsum. The ashes resulting from the combustion of this mixture, however, appear to have been hitherto deemed valueless, and it is to their particular treatment to which my invention relates.

I first mix together in a suitable vessel a quantity of the ashes and water, in the proportion of about one of the ashes and five of the water. I boil the mixture for several hours until a yellow solution is obtained. This I drain off and throw the residue of the ashes to one side.

The second stage of the process consists in boiling the yellow solution and in adding to it powdered brimstone until the whole assumes the color of melted sulphur. I then add an excess of muriatic acid. This precipitates the sulphur, which is then washed in cold water, dried, and packed for the market. From the ashes resulting from the combustion of coal-dust and gypsum, hitherto discarded as useless, a valuable marketable article is thus produced.

I do not claim broadly precipitating a boiled solution of sulphuret of calcium; but

I claim and desire to secure by Letters Patent—

Manufacturing precipitated sulphur from the ashes resulting from the combustion of gypsum and coal-dust, in the manner herein described, and for the purpose specified.

In testimony whereof I have signed my name to this specification before two subscribing witnesses.

D. E. PAYNTER.

Witnesses:
HENRY HOWSON,
HENRY ODIORNE.